United States Patent
Park et al.

(10) Patent No.: US 8,155,792 B2
(45) Date of Patent: Apr. 10, 2012

(54) AIR CONDITIONER AND METHOD OF CONTROLLING THE SAME

(75) Inventors: Hee Woong Park, Changwon-si (KR); Dong Ju Kim, Changwon-si (KR); Nae Hyun Park, Changwon-si (KR)

(73) Assignee: LG Electronics Inc., Seoul (KR)

( * ) Notice: Subject to any disclaimer, the term of this patent is extended or adjusted under 35 U.S.C. 154(b) by 271 days.

(21) Appl. No.: 12/382,756

(22) Filed: Mar. 23, 2009

(65) Prior Publication Data
US 2010/0138048 A1 Jun. 3, 2010

(30) Foreign Application Priority Data
Dec. 3, 2008 (KR) .................... 10-2008-0122127

(51) Int. Cl.
*G05B 13/00* (2006.01)
(52) U.S. Cl. ........................................ 700/276; 700/153
(58) Field of Classification Search .................... 700/276
See application file for complete search history.

(56) References Cited

U.S. PATENT DOCUMENTS

| | | | | |
|---|---|---|---|---|
| 4,479,190 A | * | 10/1984 | Takai et al. ................ 700/276 |
| 4,497,031 A | * | 1/1985 | Froehling et al. ........... 700/276 |
| 5,103,391 A | * | 4/1992 | Barrett ........................... 700/4 |
| 5,163,399 A | * | 11/1992 | Bolander et al. ........ 123/339.17 |
| 5,200,644 A | * | 4/1993 | Kobayashi et al. ............ 307/66 |
| 5,331,825 A | * | 7/1994 | Kim ............................. 62/180 |
| 5,621,662 A | * | 4/1997 | Humphries et al. .......... 700/276 |
| 5,870,994 A | * | 2/1999 | Kato ....................... 123/339.15 |
| 5,875,639 A | | 3/1999 | Kim et al. |
| 5,988,860 A | * | 11/1999 | Hefferen et al. .............. 700/276 |
| 6,154,686 A | * | 11/2000 | Hefferen et al. .............. 700/276 |
| 6,408,225 B1 | * | 6/2002 | Ortmeier et al. .............. 700/254 |
| 6,549,826 B1 | * | 4/2003 | Pouchak et al. .............. 700/276 |
| 6,735,968 B2 | * | 5/2004 | Kurita et al. ................ 62/228.4 |
| 6,840,053 B2 | * | 1/2005 | Lindner et al. ................. 62/140 |
| 6,870,139 B2 | * | 3/2005 | Petrenko ....................... 219/482 |
| 7,034,257 B2 | * | 4/2006 | Petrenko ....................... 219/482 |
| 7,706,928 B1 | * | 4/2010 | Howell et al. ................ 700/295 |
| 7,734,381 B2 | * | 6/2010 | Conger et al. ................ 700/301 |
| 2003/0182956 A1 | * | 10/2003 | Kurita et al. ................ 62/228.1 |
| 2004/0146085 A1 | * | 7/2004 | Lindner et al. ................ 374/109 |
| 2005/0204760 A1 | * | 9/2005 | Kurita et al. ................ 62/228.1 |
| 2007/0103319 A1 | * | 5/2007 | Pedraza et al. ................ 340/604 |
| 2009/0107160 A1 | * | 4/2009 | Montminy et al. ............. 62/239 |
| 2009/0107657 A1 | * | 4/2009 | Montminy et al. ....... 165/104.31 |
| 2009/0112368 A1 | * | 4/2009 | Mann et al. .................... 700/275 |
| 2009/0230307 A1 | * | 9/2009 | Han et al. ...................... 250/342 |

(Continued)

FOREIGN PATENT DOCUMENTS
CN 1115028 1/1996
(Continued)

*Primary Examiner* — Albert Decady
*Assistant Examiner* — Anthony Whittington
(74) *Attorney, Agent, or Firm* — McKenna Long & Aldridge LLP (57) ABSTRACT

The present invention relates to an air conditioner. The air conditioner includes a discharge driving unit for discharging an air-conditioned air, a sensor module for detecting first and second radiation signals for heat sources while the sensor module rotates and performs scan in first and second rotation directions and for outputting a human body detection signal based on the detected first and second radiation signals, and a control unit for calculating position information of human bodies based on the human body detection signal and controlling the discharge driving unit based on the calculated position information.

11 Claims, 12 Drawing Sheets

U.S. PATENT DOCUMENTS

| | | | | |
|---|---|---|---|---|
| 2010/0060214 A1* | 3/2010 | Woodward | | 318/400.09 |
| 2010/0060215 A1* | 3/2010 | Woodward | | 318/400.09 |
| 2010/0060216 A1* | 3/2010 | Woodward | | 318/400.09 |
| 2010/0060218 A1* | 3/2010 | Woodward | | 318/400.15 |
| 2010/0060219 A1* | 3/2010 | Schock et al. | | 318/400.21 |

FOREIGN PATENT DOCUMENTS

| | | |
|---|---|---|
| CN | 101294729 A | 10/2008 |
| EP | 1 460 351 | 9/2004 |
| EP | 1985936 A1 | 10/2008 |
| GB | 2 260 830 | 4/1993 |
| WO | WO 2008/066311 A1 | 6/2008 |

\* cited by examiner

AIR CONDITIONER AND METHOD OF CONTROLLING THE SAME

This application claims priority to Korean Application No. 10-2008-0122127, filed on Dec. 3, 2008, the contents of which is hereby incorporated by reference in its entirety.

BACKGROUND OF THE INVENTION

1. Field of the Invention

The present invention relates to an air conditioner which is capable of easily separating the human bodies and human body mistake factors from among heat sources within a room.

2. Discussion of the Related Art

In general, air conditioners are household appliances for maintaining indoor air to a state which is most suitable for its use and purpose. For example, the air conditioners may be configured to control the interior of a room in an air cooling state in summer and to control the interior of a room in a warm state in winter. The air conditioners may also be configured to control an indoor humidity and indoor air in a comfortable and clean state. With the gradual expansion and use of accommodation products in life, such as the air conditioners, consumers want products with high energy efficiency, improved performance, and convenient use.

The air conditioners may be divided into a separate type air conditioner in which an indoor unit is separated from an outdoor unit, an integration type air conditioner in which an indoor unit and an outdoor unit are combined into one unit, a wall-mount air conditioner and a frame type air conditioner mounted on a wall, a slim type air conditioner configured to stand in a living room, a single type air conditioner configured to have a capacity capable of driving one indoor unit and installed at narrow places, such as homes, a large and medium-sized air conditioner configured to have a very large capacity and installed in companies or restaurants, a multi-type air conditioner configured to have a capacity enough to drive a number of indoor units.

SUMMARY OF THE INVENTION

It is, therefore, an object of the present invention to provide an air conditioner which is capable of easily separating the human bodies and human body mistake factors from among heat sources within a room.

To achieve the above object, an air conditioner according to an embodiment of the present invention includes a discharge driving unit for discharging an air-conditioned air, a sensor module for detecting first and second radiation signals for heat sources while the sensor module rotates and performs scan in first and second rotation directions and for outputting a human body detection signal based on the detected first and second radiation signals, and a control unit for calculating position information of human bodies based on the human body detection signal and controlling the discharge driving unit based on the calculated position information.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE EMBODIMENTS

Hereinafter, an air conditioner according to embodiments of the present invention will be described in detail with reference to the accompanying drawings so that they can be readily implemented by those skilled in the art.

Figure 1:
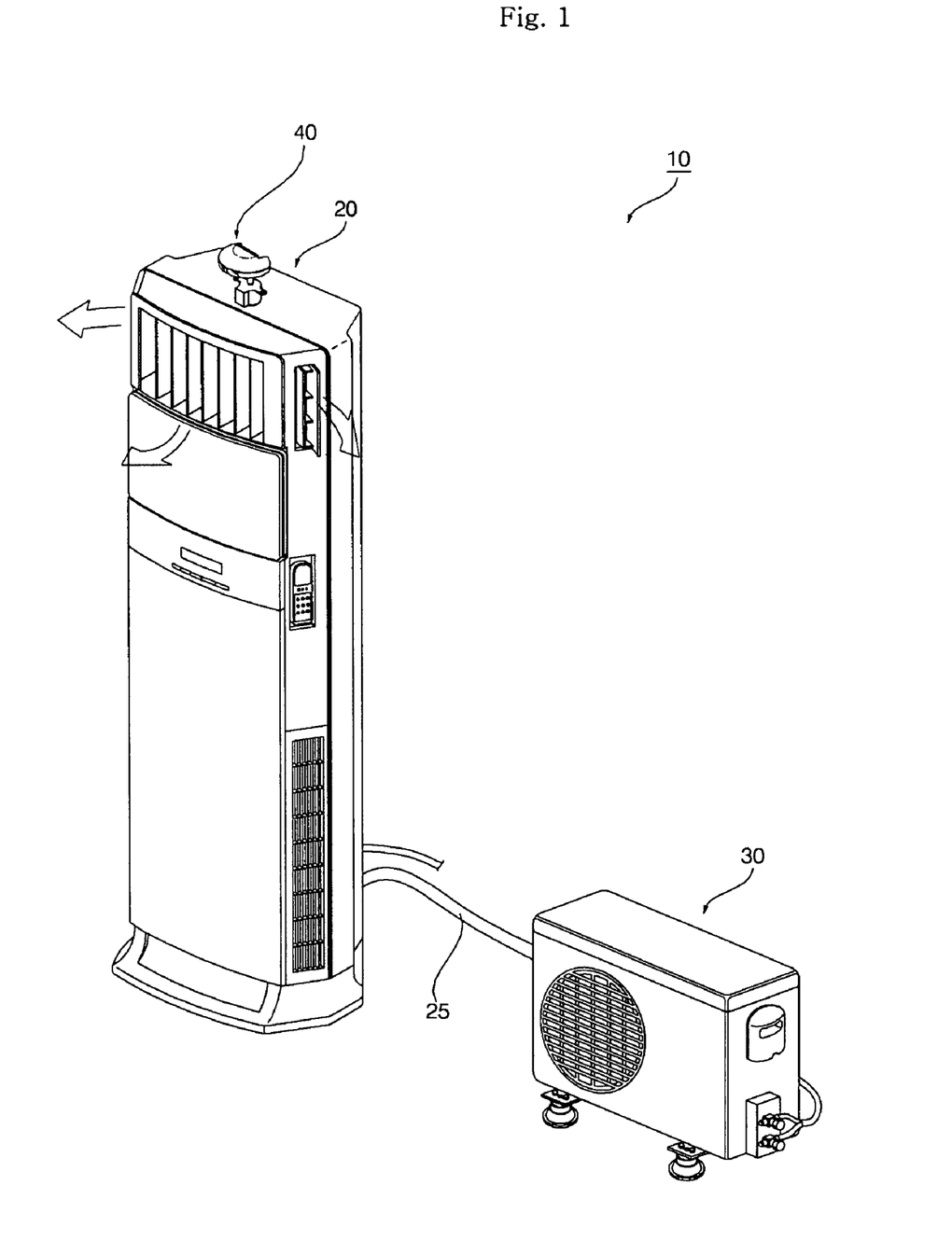
FIG. 1 is a perspective view showing an air conditioner according to an embodiment of the present invention.
Figure 2:
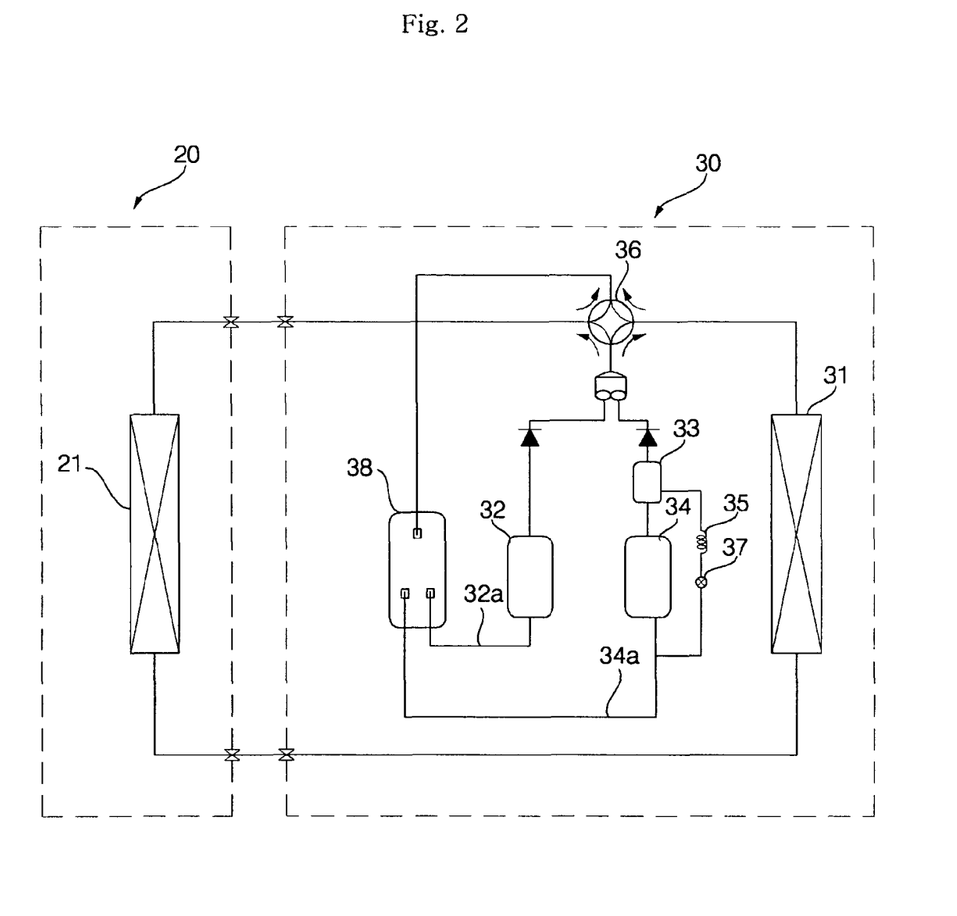
FIG. 2 is a simplified diagram showing the construction of the air conditioner shown in FIG. 1.

FIG. 1 is a perspective view showing an air conditioner according to an embodiment of the present invention, and FIG. 2 is a simplified diagram showing the construction of the air conditioner shown in FIG. 1.

The air conditioner according to the embodiment of the present invention may be applied to any air conditioners, such as a stand type air conditioner, a wall-mount air conditioner, and a ceiling type air conditioner. In the present invention, a stand type air conditioner is described as an example, for convenience of description.

Referring to FIGS. 1 and 2, the air conditioner 10 includes an indoor unit 20 and an outdoor unit 30. The indoor unit 20 and the outdoor unit 30 are coupled together by a refrigerant pipe 25.

Here, the indoor unit 20 includes a sensor module 40 for separating human bodies and human body mistake factors from among heat sources based on radiation signals for the radiation heats of the heat sources and outputting a human body detection signal.

The sensor module 40 includes at least one infrared sensor.

The indoor unit 20 includes an indoor heat exchanger 21 for performing heat exchange on an indoor air and refrigerants and an indoor ventilator (not shown) for improving the efficiency of the indoor heat exchanger 21 and at the same time circulating the indoor air.

The outdoor unit 30 includes an outdoor heat exchanger 31 configured to perform heat exchange on an outdoor air and refrigerants, a regulated compressor 32 and an inverter compressor 34 configured to compress the refrigerants, a 4-way valve 36 configured to connect the refrigerants, discharged from the regulated compressor 32 and the inverter compressor 34, to the outdoor heat exchanger 31 or the indoor heat exchanger 21, an accumulator 38 configured to supply the refrigerants of a gaseous state to the regulated compressor 32 and the inverter compressor 34, and an oil separation unit placed between the inverter compressor 34 and the 4-way valve 36 and configured to separate oil from flowing refrigerants.

In order to drive the air conditioner in an air-cooling cycle for an air cooling operation or a heating cycle for a heating operation, the 4-way valve 36 switches the flow of the refrigerants and supplies the refrigerants, discharged from the regulated compressor 32 and the inverter compressor 34, to the outdoor heat exchanger 31 or the indoor heat exchanger 21.

The accumulator 38 receives the refrigerants discharged from the 4-way valve 36 and supplies only the refrigerants of a gaseous state to the regulated compressor 32 and the inverter compressor 34.

The regulated compressor 32 is configured to compress a certain amount of the refrigerants and discharge the compressed refrigerants. The inverter compressor 34 can control the amount of compressed refrigerants in a certain range and discharge a controlled amount of refrigerants.

In particular, any one of or both the regulated compressor 32 and the inverter compressor 34 may be driven by a control unit (not shown) included in at least one of the indoor unit 20 and the outdoor unit 30. In this case, when one of the regulated compressor 32 and the inverter compressor 34 is driven, check valves (not shown) may be placed on respective discharge-side refrigerant pipes of the regulated compressor 32 and the inverter compressor 34 in order for the refrigerants to be introduced into the other compressor.

In the present embodiment, the air conditioner 10 is illustrated to include both the regulated compressor 32 and the inverter compressor 34, but may include only one of the regulated compressor 32 and the inverter compressor 34. Alternatively, the air conditioner 10 may include a plurality of the regulated compressors or a plurality of the inverter compressors.

The accumulator 38, the regulated compressor 32, and the inverter compressor 34 are connected to each other via connection pipes 32a and 34a.

The oil separation unit includes an oil separator 33 placed between a check valve and the inverter compressor 34, and a capillary tube 35 and a solenoid valve 37 placed between the oil separator 33 and the inverter compressor 34 and configured to bypass oil separated by the oil separator 33.

The capillary tube 35 is placed on the part of the oil separator 33, and the solenoid valve 37 is placed on the entry side of the inverter compressor 34.

The solenoid valve 37 is opened or shut at a predetermined cycle under the control of the controller of the air conditioner, so the oil separated by the oil separator 33 enters the entry side of the inverter compressor 34.

Further, the capacity of the regulated compressor 32 is greater than that of the inverter compressor 34. In the air cooling or heating operation, the inverter compressor 34 operates based on an indoor load capacity.

Figure 3:
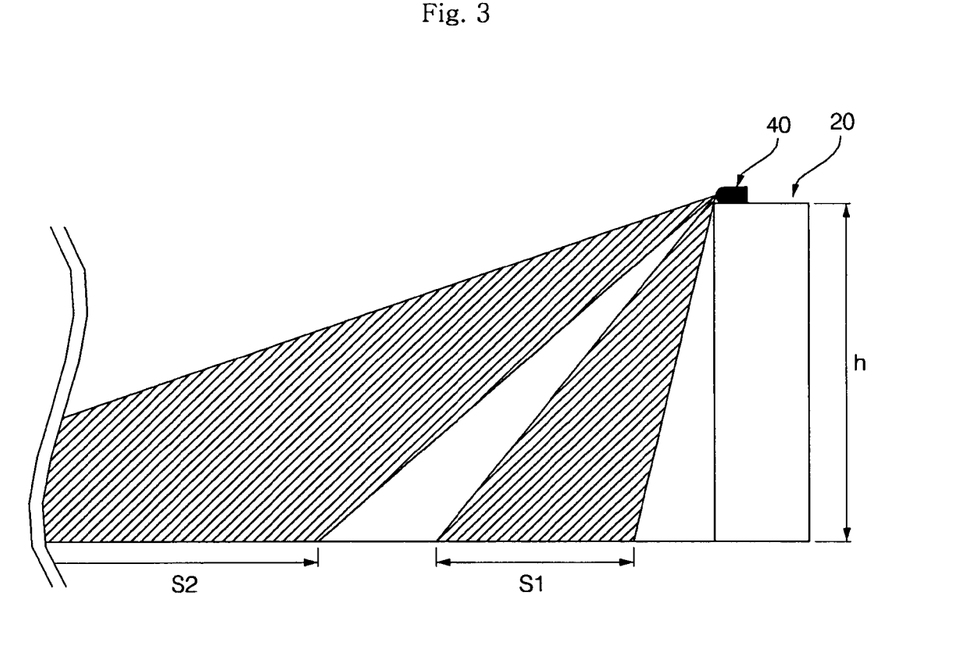
FIG. 3 is a lateral view showing the rotation recognition areas of a sensor module according to an embodiment of the present invention.

FIG. 3 is a lateral view showing rotation recognition areas of the sensor module according to an embodiment of the present invention.

Referring to FIG. 3, in the air conditioner 10, the sensor module 40 mounted on the top of the indoor unit 20 rotates and detects the radiation heats of heat sources while scanning the rotation recognition areas.

In other words, the sensor module 40 rotates and detects the radiation heats of heat sources (i.e., infrared rays emitted from the heat sources) by scanning the rotation recognition areas V1 and V2.

When the sensor module 40 scans the rotation recognition areas while rotating in a first rotation direction E1, the sensor module 40 scans the rotation recognition areas, while rotating at a first speed, and generates a first radiation signal. When the sensor module 40 scans the rotation recognition areas while rotating in a second rotation direction E2, the sensor module 40 scans the rotation recognition areas, while rotating at a second speed, and generates a second radiation signal. Next, the sensor module 40 separates human bodies and human body mistake factors from among the heat sources based on the first and second radiation signals and outputs a human body detection signal.

The control unit of the indoor unit calculates the position information of the human bodies based on the human body detection signal and controls a discharge driving unit (not shown) based on the calculated position information so that the direction of the wind and the intensity of the wind of an air-conditioned air are controlled.

Figure 4:
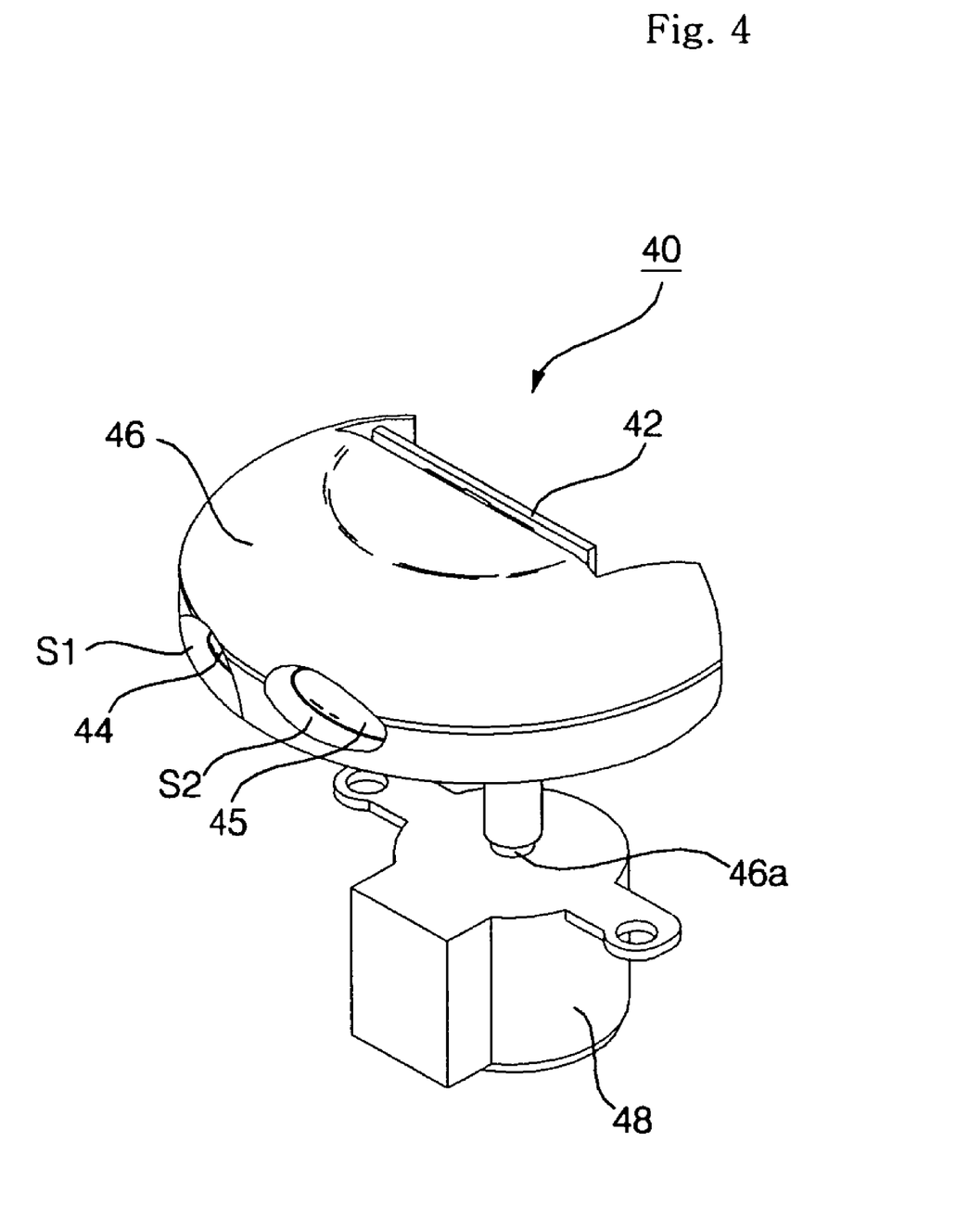
FIG. 4 is a perspective view of the sensor module shown in FIG. 3.
Figure 5:
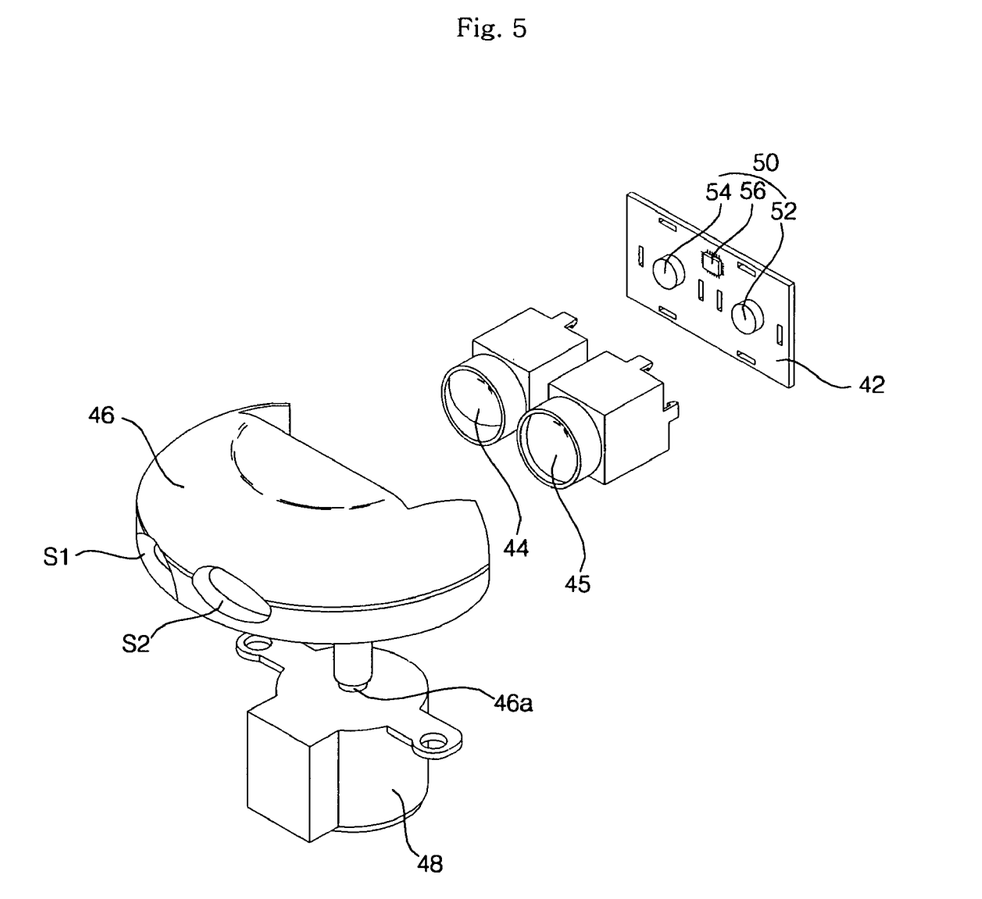
FIG. 5 is an exploded perspective view of the sensor module shown in FIG. 4.

FIG. 4 is a perspective view of the sensor module shown in FIG. 3, and FIG. 5 is an exploded perspective view of the sensor module shown in FIG. 4.

FIGS. 4 and 5 illustrate the sensor module 40 from a mechanical point of view.

Referring to FIGS. 4 and 5, the sensor module 40 is mounted on the top of the indoor unit and is configured to rotate and detect the radiation heats of heat sources by scanning the interior of a room.

The sensor module 40 includes a board 42, lenses 44 and 45, a casing 46, and a step motor 48.

The board 42 may be a Printed Circuit Board (PCB) and is coupled to the rear side of the casing 46. A sensor unit 50, including first and second sensors 52 and 54, and a sensor control unit 56 are mounted on the board 42. The sensor control unit 56 transfers the first and second radiation signals for the radiation heats of the heat sources, detected by the first and second sensors 52 and 54, to the control unit (not shown) of the indoor unit 20 and controls the operation of the step motor 38.

Here, the sensor control unit 56 may be a micro controller. The sensor control unit 56 is a control unit (not shown), included in the indoor unit 20, and is configured to transfer the human body detection signal.

The first and second sensors 52 and 54 detect the radiation heats of the heat sources within the first and second rotation recognition areas V1 and V2 and output the first and second radiation signals through a change in the voltage having a specific amount. In other words, when infrared rays which have a wavelength longer than that of a visible ray and cannot be detected by the eyes are radiated from an object having absolute zero of $-273°$ C. or more, the first and second sensors 52 and 54 detect the infrared rays and output the first and second radiation signals.

The first and second sensors 52 and 54 may be infrared sensors or pyroelectric elements, or may be elements having the pyroelectric properties and a pyroelectric effect (i.e., an effect in which electromotive force is maintained by electric charges generated from a device surface in proportion to temperature).

Each of the first and second sensors 52 and 54 includes a Cutrone filter which typically transmits the wavelength of an infrared area (7~14 µm) corresponding to an infrared wavelength band (6.5~15 µm) generated by the human bodies. The first and second sensors 52 and 54 further include respective electrodes for detecting electric charges, generated depending on a change in the temperature, in the form of voltage and for outputting the first and second radiation signals according to the detected electric charges.

The lenses 44 and 45 are optical structures for focusing infrared rays incident on the sensor unit 50 and protecting the front side of the sensor unit 50. The lenses 44 and 45 are spaced apart from the sensor unit 50.

The casing 46 protects the sensor unit 50 and integrates the board 42 and the sensor unit 50 into the lenses 44 and 45 (i.e., the optical structures).

The casing 46 includes a rotation shaft 46a to which the step motor 48 is coupled so that the sensor unit 50 can rotate.

First and second spaces S1 and S2 for determining the amounts of infrared rays, respectively, incident from the first and second rotation recognition areas V1 and V2 scanned by the first and second sensors 52 and 54, are formed in the casing 46.

The step motor 48 rotates the casing 46 so that the first and second sensors 52 and 54 rotate and detect infrared rays by scanning the first and second rotation recognition areas V1 and V2.

That is, the step motor 48 rotates at the first or second speed in the clockwise and counterclockwise directions.

It has been described that the sensor module 40 according to the present embodiment is mounted on the outside top of the indoor unit 20. However, the sensor module 40 may be placed within the indoor unit 20 from which an air-conditioned air is discharged, but not limited thereto.

Figure 6:
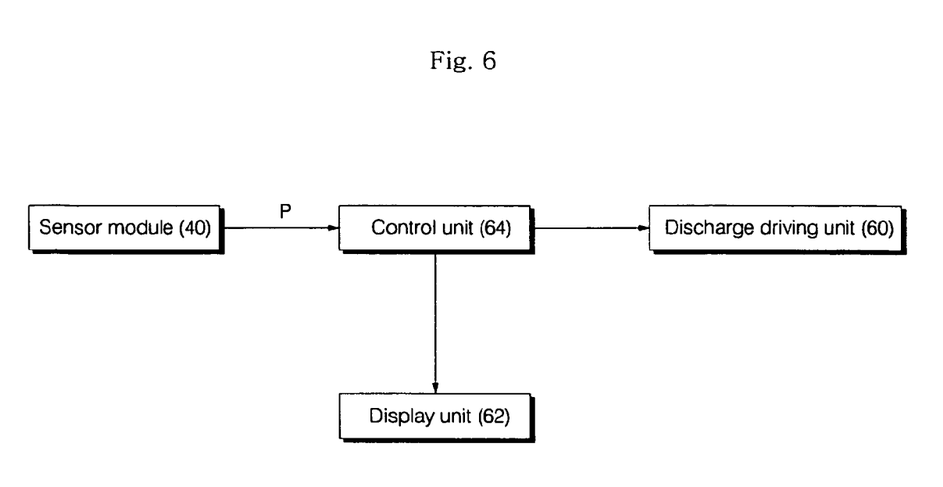
FIG. 6 is a functional block diagram of the air conditioner according to an embodiment of the present invention.

FIG. 6 is a functional block diagram of the air conditioner according to an embodiment of the present invention.

Referring to FIG. 6, the air conditioner includes the sensor module 40 for outputting a human body detection signal P, a discharge driving unit 60 for discharging an air-conditioned air, a display unit 62 for displaying the direction of the wind and the intensity of the wind of the air-conditioned air and position information of the human bodies, and a control unit 64 for calculating the position information of the human bodies based on the human body detection signal P and controlling the discharge driving unit 60 and the display unit 62.

The discharge driving unit 60 adjusts the direction of the wind of the air-conditioned air by controlling at least one of upper and lower vanes and right and left vanes from which the air-conditioned air is discharged.

The display unit 62 displays the positions of the human bodies and human body mistake factors, which belong to heat sources, depending on the first and second rotation recognition areas (not shown) and the position information of the human bodies, scanned and detected by the sensor module 40, according to a control command from the control unit 64.

The control unit 64 calculates intervals between the human bodies and the heights of the human bodies based on the position information of the human bodies and controls the discharge driving unit 60 and the display unit 62 based on the calculated information.

The control unit 64 also controls the step motor (not shown), included in the sensor module 40, on the basis of the first or second rotation direction so that the step motor rotates at the first or second speed.

Here, the control unit 64 controls the sensor module 40 at a point of time at which the human body detection signal P has been input (i.e., after the sensor module has performed scan while rotating in the first rotation direction E1) so that the sensor module 40 rotates in the second rotation direction E2.

Figure 7:
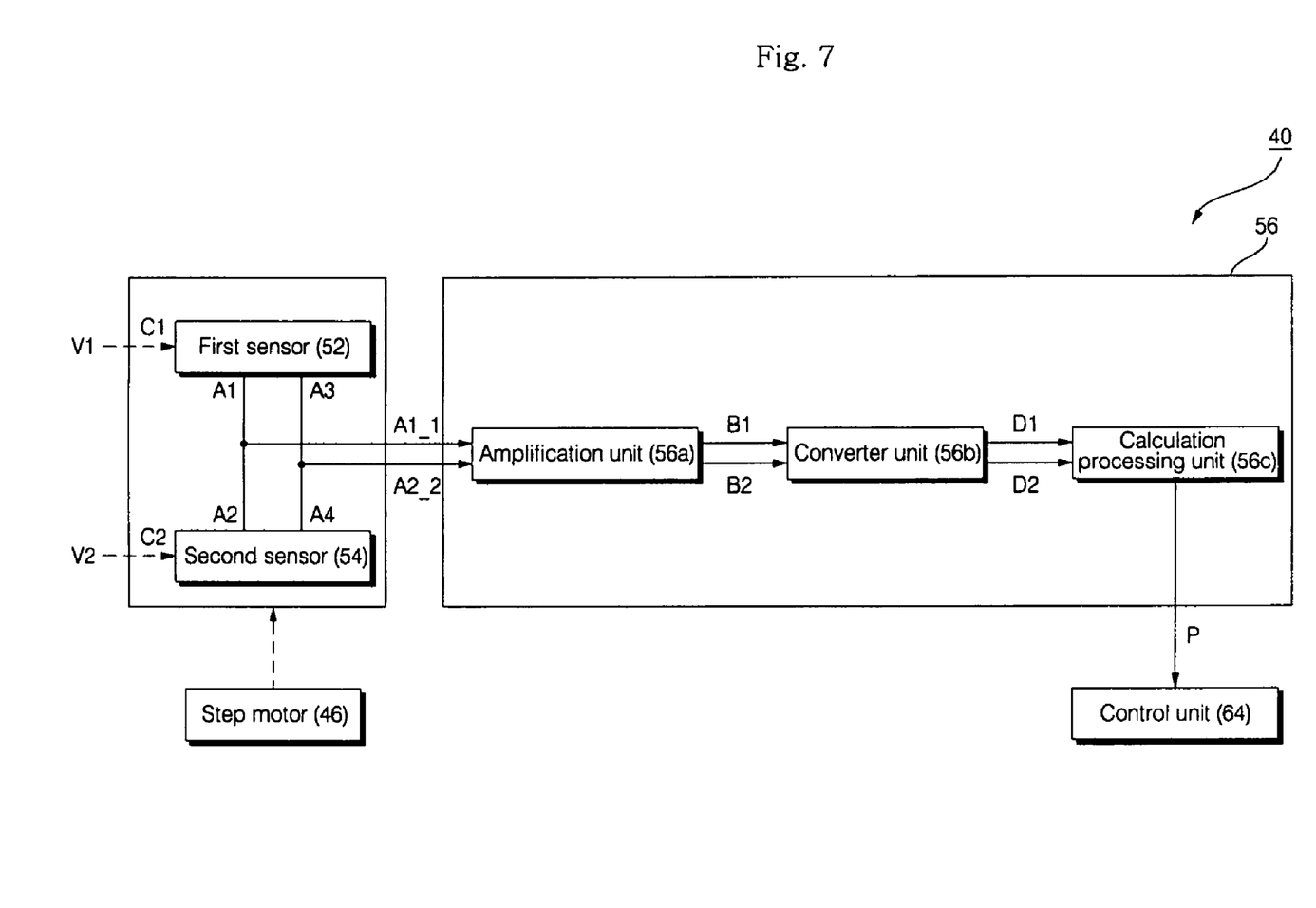
FIG. 7 is a functional block diagram of the sensor module shown in FIG. 6.

FIG. 7 is a functional block diagram of the sensor module shown in FIG. 6.

Referring to FIG. 7, the sensor module 40 includes the sensor unit 50, the step motor 46, and the sensor control unit 56. The sensor unit 50 outputs first and second radiation signals A1_1 and A2_2 for the radiation heats C1 and C2 of heat sources in response to the first and second rotation directions E1 and E2. The step motor 46 rotates the sensor unit 50 in the first or second rotation direction E1 or E2. The sensor control unit 56 separates the human bodies and the human body mistake factors from among the heat sources on the basis of the first and second radiation signals A1_1 and A2_2 and outputs the human body detection signal P.

The sensor unit 50 includes the first sensor 52 for detecting the first radiation heat C1 of a heat source within the first rotation recognition area V1 and the second sensor 54 for detecting the second radiation heat C2 of a heat sources within the second rotation recognition area V2.

The first sensor 52 is inclined at a first predetermined angle and is configured to detect infrared rays emitted from the first rotation recognition area V1 (i.e., the first radiation heat C1 of the heat source).

Further, the second sensor 54 is inclined at a second predetermined angle and is configured to detect infrared rays emitted from the second rotation recognition area V2 (i.e., the second radiation heat C2 of the heat source).

The first radiation signal A1_1 includes the first and second rotation radiation signals A1 and A2, which have been detected within the first and second rotation recognition areas V1 and V2 by the first and second sensors 52 and 54 which rotating in the first rotation direction E1. The second radiation signal A2_2 includes the third and fourth rotation radiation signals A3 and A4, which have been detected within the first and second rotation recognition areas V1 and V2 by the first and second sensors 52 and 54 which rotating in the second rotation direction E2.

Here, an angle, formed by the first predetermined angle of the first sensor 52 with the ground, may be smaller than an angle, formed by the second predetermined angle of the second sensor 54 with the ground.

In other words, the first sensor 52 detects a close distance, and the second sensor 54 detects a long distance.

The step motor 46 is controlled by the control unit (not shown), included in the indoor unit 20, and is configured to rotate in the first or second rotation direction E1 or E2 at the first or second speed depending on a first or second mode.

The step motor 46 may have a turning radius of 130 to 170°.

The sensor control unit 56 includes an amplification unit 56a, a converter unit 56b, and a calculation processing unit 56c. The amplification unit 56a amplifies the first and second radiation signals A1_1 and A2_2 and outputs respective first and second amplification radiation signals B1 and B2. The converter unit 56b converts the first and second amplification radiation signals B1 and B2 into respective first and second digital signals D1 and D2. The calculation processing unit 56c separates the human bodies and the human body mistake factors from among the heat sources by performing a specific operation on the first and second digital signals D1 and D2 and outputs the human body detection signal P for the human bodies to the control unit 64.

The converter unit 56b converts the first and second amplification radiation signals B1 and B2 into the first and second digital signals D1 and D2, respectively, through filtering and sampling.

The calculation processing unit 56c separates the human bodies and the human body mistake factors from among the heat sources by performing a specific operation on the first and second digital signals D1 and D2 using a specific program.

That is, the calculation processing unit 55c separates and removes the human body mistake factors based on the first digital signal D1, scanned by the first and second sensors 52 and 54 while rotating in the first rotation direction E1, separates and removes the human body mistake factors based on the second digital signal D2, scanned by the first and second sensors 52 and 54 while rotating in the second rotation direction E2, and outputs the human body detection signal P for the human bodies, which belong to the heat sources.

The control unit 64 controls the sensor module 40 at a point of time at which the human body detection signal P has been input (i.e., after the sensor module has performed scan while rotating in the first rotation direction E1) so that the sensor module 40 rotates in the second rotation direction E2. Further, the control unit 64 controls the discharge driving unit 60 on the basis of the human body detection signal P so that the air-conditioned air is discharged toward the human body.

Figure 8:
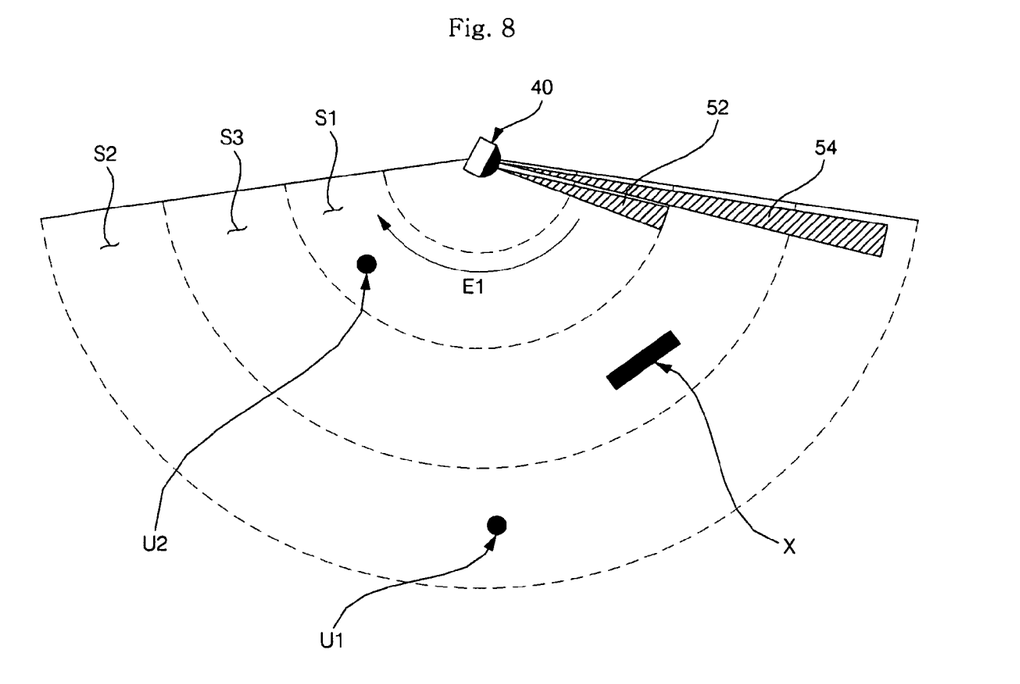
FIG. 8 is a simplified view showing an operation when the sensor module shown in FIG. 6 rotates and performs scan in a first rotation direction.
Figure 9:
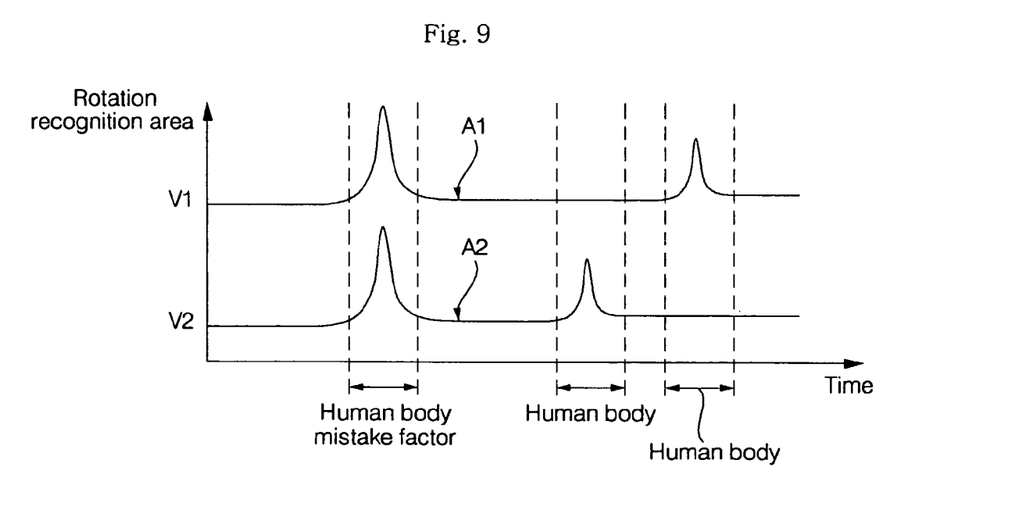
FIG. 9 is a waveform showing a first radiation signal when the sensor module shown in FIG. 8 rotates and performs scan in the first rotation direction.

FIG. 8 is a simplified view showing an operation when the sensor module shown in FIG. 6 rotates and performs scan in the first rotation direction, and FIG. 9 is a waveform showing the first radiation signal when the sensor module shown in FIG. 8 rotates and performs scan in the first rotation direction.

FIGS. 8 and 9 are described in connection with the functional block diagram of FIG. 7.

Referring to FIGS. 8 and 9, the sensor module 40 detects heat sources U1, U2, and X placed within a room while rotating and performing scan in the first rotation direction E1.

In this case, when the sensor module 40 rotates and performs scan in the first rotation direction E1, the sensor module 40 outputs the first radiation signal A1_1 based on the first and second rotation radiation signals A1 and A2, which have been respectively detected by the first and second sensors 52 and 54 from human bodies U1 and U2 and a human body mistake factor X, which belong to the heat sources U1, U2, and X within the first and second rotation recognition areas V1 and V2.

That is, when the sensor module 40 rotates and performs scan in the first rotation direction E1, the sensor module 40 moves at a first speed. Here, the first speed is transferred to the control unit 56 so that the position of the human body mistake factor X from among the heat sources U1, U2, and X can be checked and the human body mistake factor X can be separated and removed.

Figure 10:
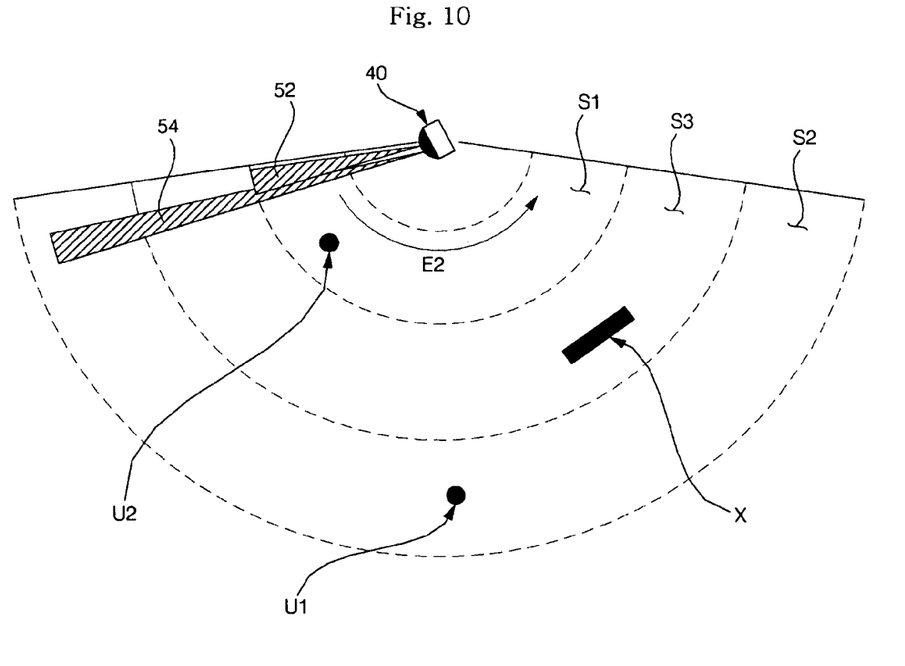
FIG. 10 is a simplified view showing an operation when the sensor module shown in FIG. 6 rotates and performs scan in a second rotation direction.
Figure 11:
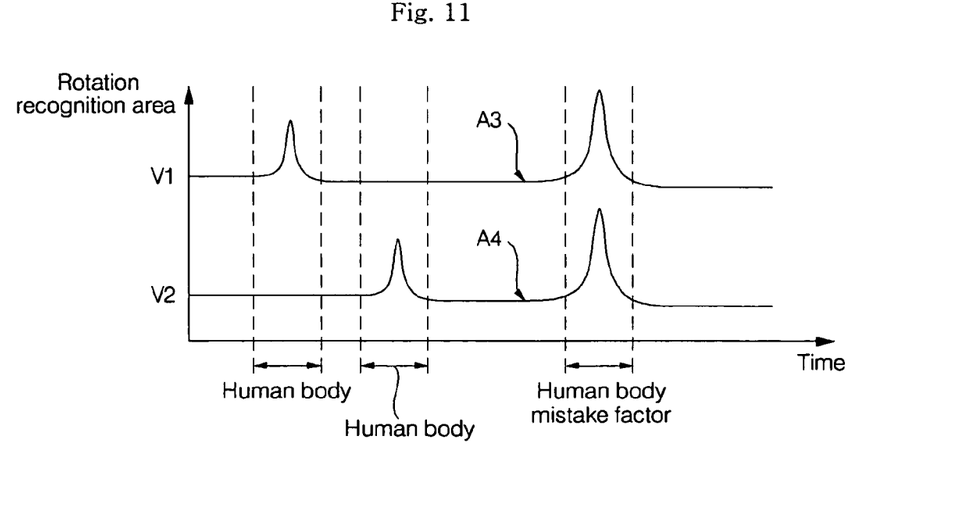
FIG. 11 is a waveform showing a second radiation signal when the sensor module shown in FIG. 10 rotates and performs scan in the second rotation direction.

FIG. 10 is a simplified view showing an operation when the sensor module shown in FIG. 6 rotates and performs scan in the second rotation direction, and FIG. 11 is a waveform showing the second radiation signal when the sensor module shown in FIG. 10 rotates and performs scan in the second rotation direction.

FIGS. 10 and 11 are described in connection with the functional block diagram of FIG. 7.

Referring to FIGS. 10 and 11, the sensor module 40 detects heat sources U1, U2, and X placed within a room while rotating and performing scan in the second rotation direction E2.

In this case, when the sensor module 40 rotates and performs scan in the second rotation direction E2, the sensor module 40 outputs the second radiation signal A2_2 based on the third and fourth rotation radiation signals A3 and A4, which have been respectively detected by the first and second sensors 52 and 54 from the human bodies U1 and U2 and the human body mistake factor X, which belong to the heat sources U1, U2, and X within the first and second rotation recognition areas V1 and V2.

That is, when the sensor module 40 rotates and performs scan in the second rotation direction E2, the sensor module 40 moves at a second speed. Here, the second speed is transferred to the control unit 56 so that the position of the human body mistake factor X from among the heat sources U1, U2, and X can be checked and the human body mistake factor X can be separated and removed.

Figure 12:
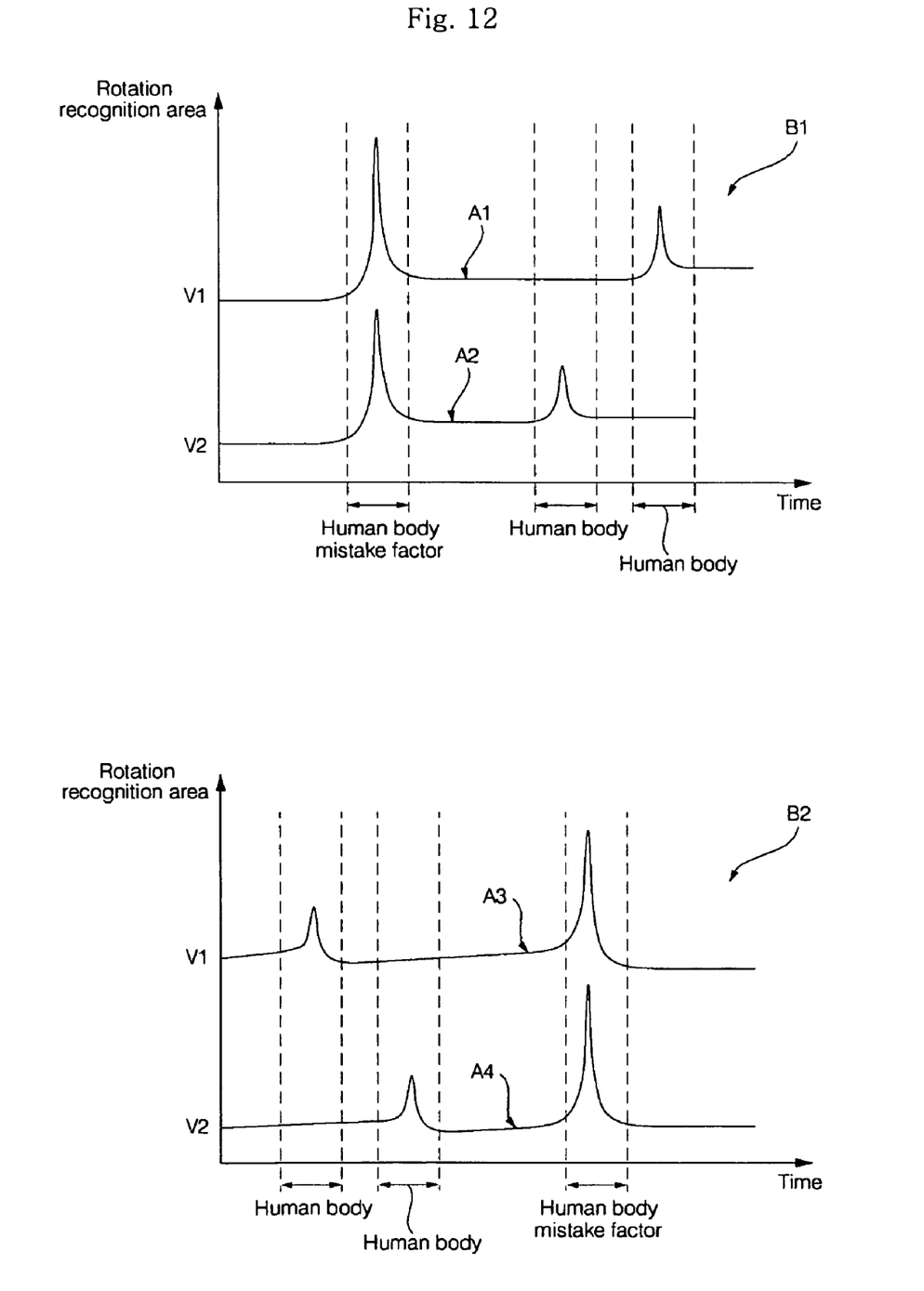
FIG. 12 is a waveform showing first and second amplification radiation signals respectively obtained by amplifying the first and second radiation signals shown in FIGS. 9 and 11.
Figure 13:
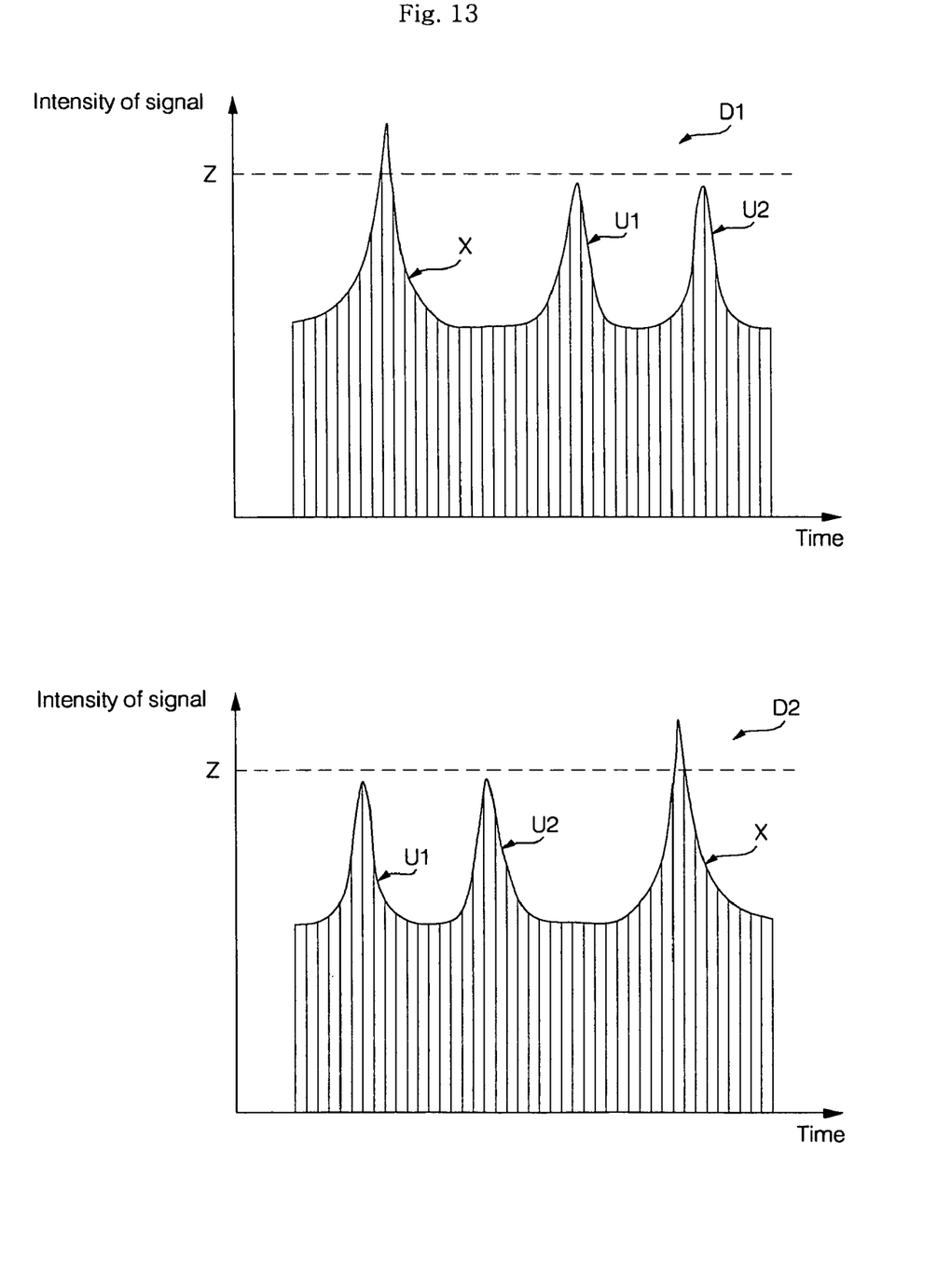
FIG. 13 is a waveform showing first and second digital signals respectively obtained by sampling the first and second amplification radiation signals shown in FIG. 12.
Figure 14:
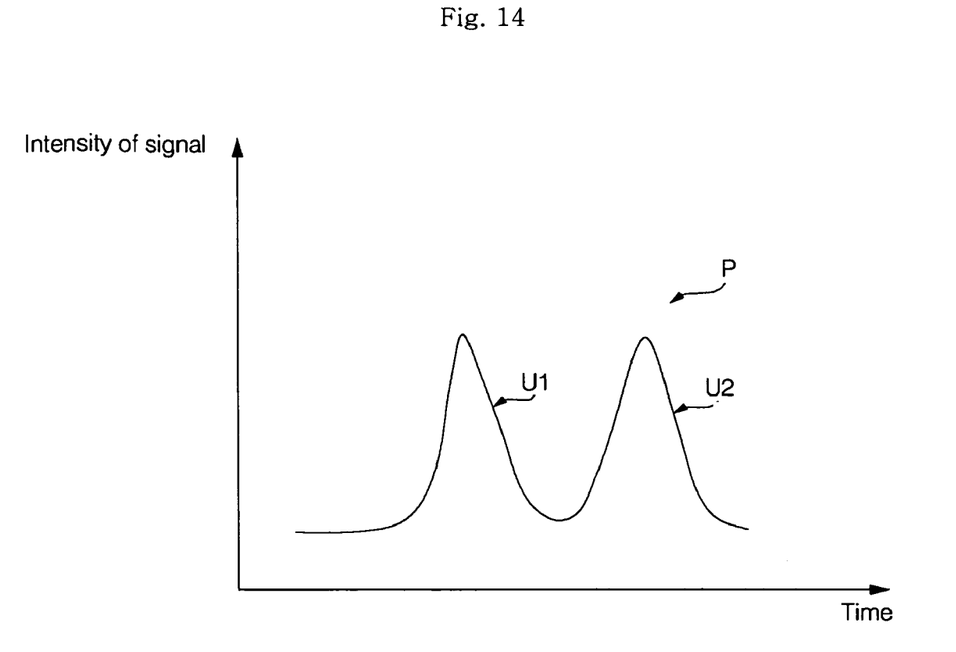
FIG. 14 is a waveform showing a human body detection signal converted from the first and second digital signals shown in FIG. 13.

FIG. 12 is a waveform showing the first and second amplification radiation signals respectively obtained by amplifying the first and second radiation signals shown in FIGS. 9 and 11, FIG. 13 is a waveform showing the first and second digital signals respectively obtained by sampling the first and second amplification radiation signals shown in FIG. 12, and FIG. 14 is a waveform showing the human body detection signal converted from the first and second digital signals shown in FIG. 13.

Referring to FIG. 12, the sensor control unit 56 receives the first and second radiation signals A1_1 and A2_2 from the first and second sensors 52 and 54.

Here, the amplification unit 56a outputs the first and second amplification radiation signals B1 and B2 respectively obtained by amplifying the first and second radiation signals A1_1 and A2_2 to a set amplification degree.

Further, referring to FIG. 13, the converter unit 56b generates the first and second digital signals D1 and D2 respectively obtained by sampling the first and second amplification radiation signals B1 and B2 according to a set sampling cycle.

Here, the converter unit 56b removes noises by filtering the first and second amplification radiation signals B1 and B2 and performs sampling.

Referring to FIG. 14, the sensor control unit 56c checks portions of the first and second digital signals D1 and D2, each having a first set value Z or more, based on the human body mistake factor X, removes the portions of the first and second digital signals D1 and D2, each having the first set value Z or more, by composing the first and second digital signals D1 and D2, and generates the human body detection signal P.

Accordingly, the sensor control unit 56c transmits the human body detection signal P from which the human body mistake factors X from among the heat sources U1, U2, and X of the first and second digital signals D1 and D2 have been removed and in which only the human bodies U1 and U2 are detected to the control unit 64.

Accordingly, the control unit 64 calculates the position information of the human bodies based on the intensity of the human body detection signal P. Here, the position information of the human bodies may include at least one of an interval between the human bodies, and the directions and heights of the human bodies.

The control unit 64 controls the discharge driving unit 40 based on at least one of an interval between the human bodies U1 and U2 and the directions and heights of the human bodies U1 and U2 so that the direction of the wind and the intensity of the wind of the air-conditioned air are changed.

While the present invention has been shown and described in connection with the exemplary embodiments thereof, those skilled in the art will appreciate that the present invention may be changed and modified in various ways without departing from the spirit and scope of the present invention as defined in the following claims.

What is claimed is:

1. An air conditioner, comprising:

a discharge driving unit for discharging an air-conditioned air;

a sensor module for detecting first and second radiation signals for heat sources while the sensor module rotates and performs scan in first and second rotation directions and for outputting a human body detection signal based on the detected first and second radiation signals; and a control unit for calculating position information of human bodies based on the human body detection signal and controlling the discharge driving unit based on the calculated position information, wherein the sensor module comprises, a sensor unit for outputting the first and second radiation signals;

a sensor control unit for outputting the human body detection signal from which a human body mistake factor from among the heat sources has been removed based on the first and second radiation signals, and a step motor for moving the sensor unit at a first speed when the sensor unit rotates and performs scan in the first rotation direction and moving the sensor unit at a second speed when the sensor unit rotates and performs scan in the second rotation direction, wherein the sensor unit comprises, a first sensor for, when the first sensor rotates and performs scan in the first and second rotation directions, detecting the heat sources within a first rotation recognition area; and a second sensor for, when the second sensor rotates and performs scan in the first and second rotation directions, detecting the heat sources within a second rotation recognition area, wherein the first radiation signal comprises, a first rotation radiation signal, respectively, detected by the first sensor within the first rotation recognition area when the sensor unit rotates and performs scan in the first rotation direction, and a second rotation radiation signal, respectively, detected by the second sensors within the second rotation recognition area when the sensor unit rotates and performs scan in the first rotation direction.

2. The air conditioner as claimed in claim 1, further comprising a display unit for displaying the position information of the human bodies and at least one of a direction of a wind and the intensity of the wind of the air-conditioned air.

3. The air conditioner as claimed in claim 1, wherein the sensor unit comprises at least one infrared sensor.

4. The air conditioner as claimed in claim 1, wherein the second radiation signal comprises, a third rotation radiation signal, respectively, detected by the first sensor within the first rotation recognition area when the sensor unit rotates and performs scan in the second rotation direction, and a fourth rotation radiation signal, respectively, detected by the second sensor within the second rotation recognition area when the sensor unit rotates and performs scan in the second rotation direction.

5. The air conditioner as claimed in claim 1, wherein the sensor control unit comprises:

an amplification unit for amplifying the first and second radiation signals and outputting respective first and second amplification radiation signals;

a converter unit for converting the first and second amplification radiation signals into respective first and second digital signals; and a calculation processing unit for outputting the human body detection signal from which the human body mistake factor from among the heat sources has been removed based on the first and second digital signals.

6. The air conditioner as claimed in claim 5, wherein the converter unit converts the first and second amplification radiation signals into the first and second digital signals each of which has been sampled according to a set sampling cycle.

7. The air conditioner as claimed in claim 5, wherein the calculation processing unit checks portions of the first and second digital signals, each having a first set value or more, based on the human body mistake factor, removes the portions of the first and second digital signals D1 and D2, each having the first set value or more, by composing the first and second digital signals, and generates the human body detection signal.

8. The air conditioner as claimed in claim 1, wherein the control unit calculates the position information of the human bodies based on an intensity of the human body detection signal.

9. The air conditioner as claimed in claim 8, wherein the position information of the human bodies comprises at least one of an interval between the human bodies, and directions and heights of the human bodies.

10. The air conditioner as claimed in claim 9, wherein the control unit controls the discharge driving unit based on at least one of the interval between the human bodies, and directions and heights of the human bodies so that a direction of a wind and the intensity of the wind of the air-conditioned air are changed.

11. The air conditioner as claimed in claim 1, wherein the control unit controls the sensor module so that the sensor module rotates and performs scan in the second rotation direction after the sensor module has rotated and performed scan in the first rotation direction.

* * * * *